United States Patent
Hale, Jr. et al.

[15] 3,670,896
[45] June 20, 1972

[54] APPARATUS FOR REMOVING OIL FROM A BODY OF WATER

[72] Inventors: Frank E. Hale, Jr., 1638 Santa Barbara Street; Frank E. Hale, Sr., 4005 Santa Cruz Avenue, both of San Diego, Calif. 92107

[22] Filed: Jan. 22, 1971

[21] Appl. No.: 108,839

[52] U.S. Cl. .......................... 210/242, 210/391, 210/DIG. 21
[51] Int. Cl. .......................................................... E02b 15/04
[58] Field of Search ................... 210/40, 242, DIG. 21, 391, 210/400

[56] References Cited

UNITED STATES PATENTS

| | | | |
|---|---|---|---|
| 3,314,540 | 4/1967 | Lane | 210/242 X |
| 3,358,838 | 12/1967 | Kosar et al. | 210/242 X |
| 3,539,508 | 11/1970 | Bulkley et al. | 210/242 |
| 3,259,245 | 7/1966 | Earle | 210/242 X |
| 3,539,048 | 11/1970 | Pearson | 210/242 |
| 1,591,024 | 7/1926 | Dodge | 210/DIG. 21 |
| 3,348,690 | 10/1967 | Cornelissen | 210/DIG. 21 |

*Primary Examiner*—Samih N. Zaharna
*Attorney*—R. S. Sciascia, George J. Rubens and J. W. McLaren

[57] ABSTRACT

Apparatus and method for removing a liquid hydrocarbon material, such as oil, from a water surface wherein the apparatus includes a collection surface which is moved into and out of the water, the collection surface being made of a material including a high molecular weight solid hydrocarbon which is wettable with oil so that when the surface emerges from the water the oil collected by adsorption is wiped from the surface and collected.

2 Claims, 7 Drawing Figures

INVENTORS
FRANK E. HALE, JR.
BY FRANK E. HALE, SR.

ATTORNEYS

APPARATUS FOR REMOVING OIL FROM A BODY OF WATER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to liquid separators and more particularly to an apparatus and method of removing a liquid hydrocarbon material from a body of water by an adsorptive technique.

Recent oil spills in coastal waters and harbors have dramatically highlighted the need for more expeditious and efficient apparatus for removing the oil from the surface of the water. Time is of the essence to prevent the oil from contaminating beaches, and destroying marine life. Various apparatus and techniques have been employed to confine and recover the oil from such spills. One class of recovery apparatus employs a vacuum principle in which the oil is sucked off the surface similar to the conventional carpet cleaner. The most common method is to broadcast common straw over the area and to remove the oil by absorption. While this technique in practice has proven to be effective, it is time-consuming and requires substantial manpower to distribute the fresh straw, collect the used straw after it is soaked with oil, and then transport the straw for disposal by burning or the like. Another similar method relying on an absorptive technique, sprays urethane-foam chips to float free over the oil spill in a contained area. A conveyer belt picks up the oil-absorbing chips and carries them to a compressor unit to squeeze out the oil. The oil is collected in tanks, and the foam chips can be used and distributed back on the slick. Instead of foam chips, other absorptive elements such as terry cloth belts could be used.

There are several disadvantages of using an absorptive technique as illustrated by the devices heretofore described. In the case of the straw, a large volume is required since it can be used only once. Reusable plastic chips and knobby fabrics can be used so that a lesser volume is required. However, a common disadvantage of all absorption methods is that it takes a significantly longer time for the material to absorb the oil where heavy or high viscosity oils are involved, and a certain amount of water is absorbed and must be separated. In addition, the squeezing action on the absorptive materials is highly destructive requiring frequent replacement which is costly and time-consuming especially in a water-borne environment.

SUMMARY OF THE INVENTION

The present invention utilizes the principle of adsorption for separating and removing petroleum liquids from a body of water, as distinguished from the use of an absorption theory as in the prior art.

The apparatus includes a collection member having a relatively smooth surface coated or otherwise formed of a material including a high molecular weight hydrocarbon or similar material which has the property of being wettable with said oil but repellant to water. The collection member is moved in and out of the water containing the oil. The prepared surface of the collection member causes the oil to adhere to the surface by film cohesion while repelling the water. As the collection surface emerges from the water the adhering oil is wiped from the surface and piped to a suitable reservoir.

Because of the wiping action it is desirable that the collection surface be a solid hydrocarbon material having a high molecular weight, such as wax, paraffin, nylon and the like.

By utilizing a relatively smooth adsorptive surface and a wiping action to remove the oil adhering to the surface, the invention apparatus can efficiently collect thin petroleum films as well as heavy petroleum films, such as bunker oils, since the technique does not rely on the collection surface to absorb the liquid substance being collected. The wiping action, as distinguished from a squeezing action as in the prior art, is less destructive to the collection surface.

STATEMENT OF THE OBJECTS OF INVENTION

An important object of this invention is to devise a method and apparatus for efficiently removing and collecting liquid petroleum from a body of water.

A corollary object is to provide such apparatus which is relatively simple, will require a minimum of maintenance, wear, and replacement of moving elements.

Another important object is to provide such apparatus which relies on an adsorption technique for removal of the liquid petroleum products.

Other objects, advantages and novel features of the invention will become apparent from the following detailed description of the invention when considered in conjunction with the accompanying drawings.

DESCRIPTION OF THE PREFERRED EMBODIMENT

Figure 1:
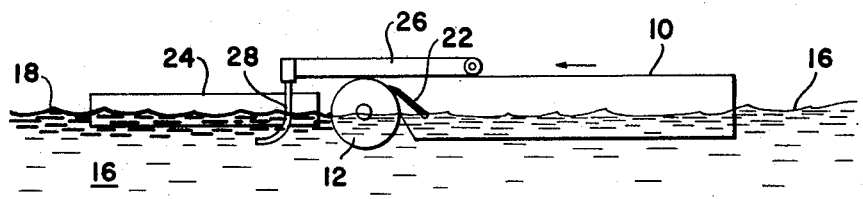
FIGS. 1 and 2 are a side elevation and top diagrammatic views respectively of an invention apparatus utilizing a drum-shaped collection surface.
Figure 2:
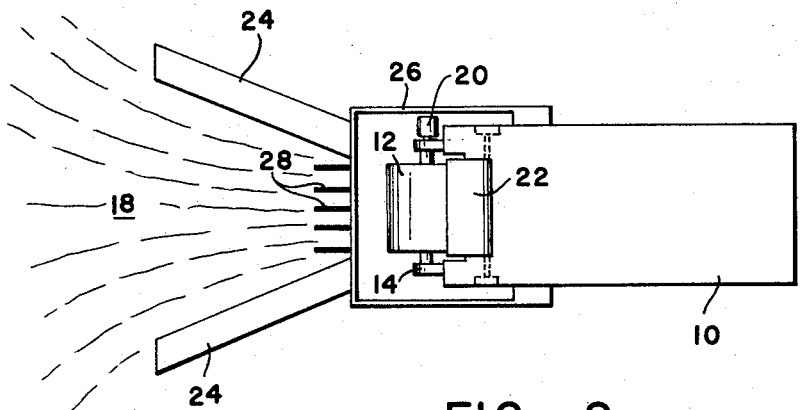

Referring to the drawing where like reference numerals refer to similar parts throughout the figures there is shown in FIGS. 1 and 2 a boat or barge 10 having at its bow a drum 12 journalled thereto at 14 for rotation. The diameter of the drum and the arrangement of its supporting structure ensures that a substantial portion of the drum will enter the body of water 16 on which a layer of liquid hydrocarbon 18, usually oil, is floating, due to an oil spill or the like arising by one of a variety of causes. Drum 12 is driven by any suitable motor 20. Boat 10 may be propelled by hand manipulation or motor driven in any conventional manner.

Drum 12 can be referred to as a collection member for removing the oil from the body of water, and as will be apparent is only one of several configurations that can be employed following the teaching of this invention. The surface character of the collection member is an important feature of the invention in that it is especially prepared to accomplish the oil removal by an adsorption technique, that is, to cause the oil to wet and adhere to the drum surface for removal by the action of a wiper blade 22.

The surface of drum is made of a material including a high molecular weight solid hydrocarbon in one of several ways. The drum surface can be fabricated of such a material, or a coating may be applied or impregnated to a different base material which may be metal, plastic or the like. For example, where a synthetic hydrocarbon is used such as nylon the entire roller, or at least a surface layer, can be fabricated, such as by casting. Where a wax or paraffin type of hydrocarbon material is used it may be coated or preferably impregnated into the surface.

Referring again to FIGS. 1 and 2, a pair of floats 24 may be positioned forward of barge 10 forming a V-shaped trough into which the oil spill 18 is funneled and guided into contact with the collection member, drum 12 as the barge 10 is propelled under any suitable power, pushing the floats 24 before it. Suspended from a boom 26 is a rake 28 positioned before the collection member 12 to collect any floating solid flotsam before it engages the collection member. Boom 26 may be pivotally mounted to the barge for disposing the flotsam collected by rake 28, i.e., dumping in barge 10. The oil removed by wiper 22 may also be accumulated in suitable containers in barge 10.

Figure 3:
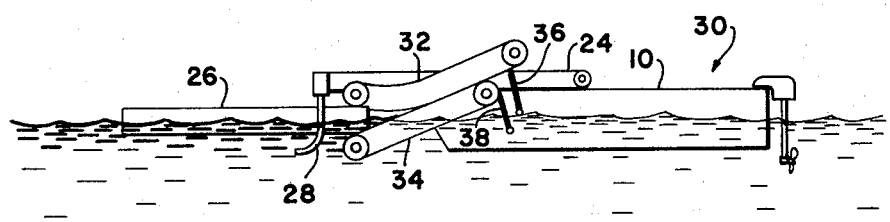
FIG. 3 is a side elevation view of a modified invention apparatus utilizing a pair of belt-shaped collection surfaces.

The collection apparatus 30 shown in FIG. 3 is similar to the species shown in FIGS. 1 and 2, the principle difference being in the use of a flexible type of collection member in place of a rigid drum member. As shown in FIG. 3 the collection member comprises a pair of conveyer belts 32 and 34, the lower belt 34 being positioned into the water as will be described in reference to FIGS. 6 and 7, only one belt can be used. The direction of belt movement is indicated by arrows. Each belt is provided with a wiper blade 36 and 38, respectively. Belts 32 and 34 may be woven of a durable fabric material, such as nylon thread, which may or may not be impregnated the high molecular weight solid hydrocarbon material, such as a wax. The operation is basically the same as the apparatus in FIGS. 1 and 2.

Figure 4:
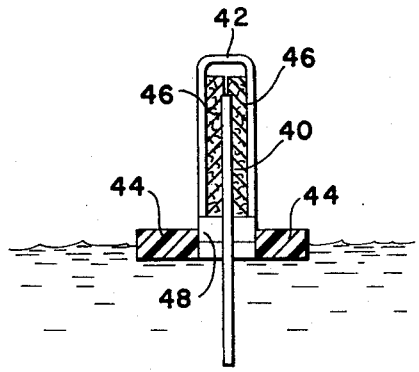
FIG. 4 is a side elevation view of a modified invention apparatus utilizing a single disk-shaped collection surface.
Figure 5:
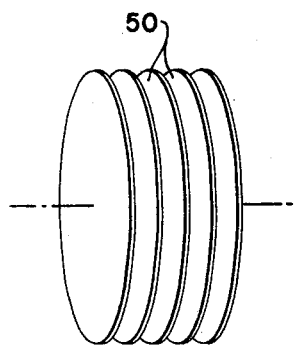
FIG. 5 is a perspective view of a collection surface showing a plurality of disks of the type shown in FIG. 4.

In FIG. 4 the collection member is a single disk 40 rotatably supported in a housing 42 mounted on a pair of floats 44. Both specially prepared surfaces of disk 40 are contacted by suitable wiping elements 46 which removes the oil adhering thereto into collection trough 48 for removal. The collection apparatus may include a plurality of disks 50 as illustrated in FIG. 5. The disks 40 and 50, being of rigid material such as drum 12 in FIGS. 1 and 2 may have a surface prepared in a similar manner as described.

Figure 6:
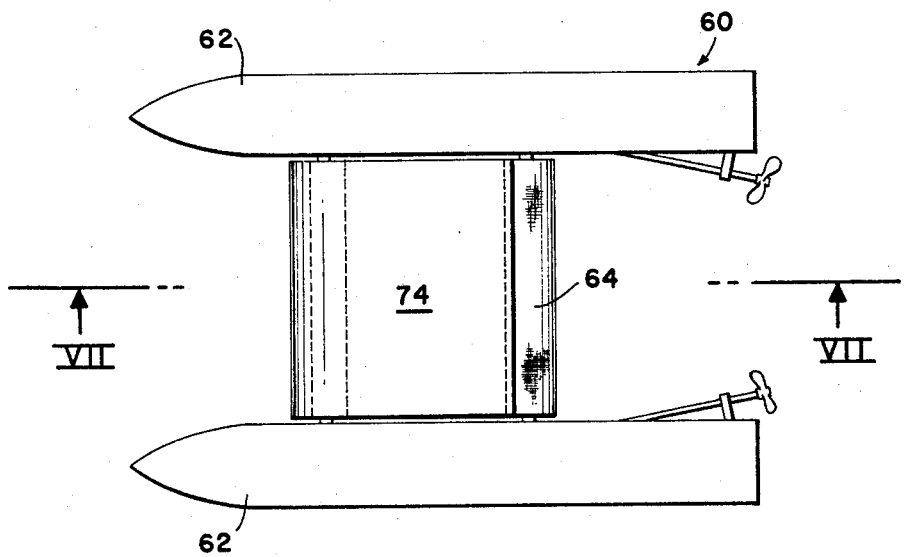
FIGS. 6 and 7 show a top and side elevation diagrammatic views respectively of a modified apparatus utilizing a catamaran boat and a single belt-shaped collection surface, FIG. 7 being taken along line VII—VII of FIG. 6.
Figure 7:
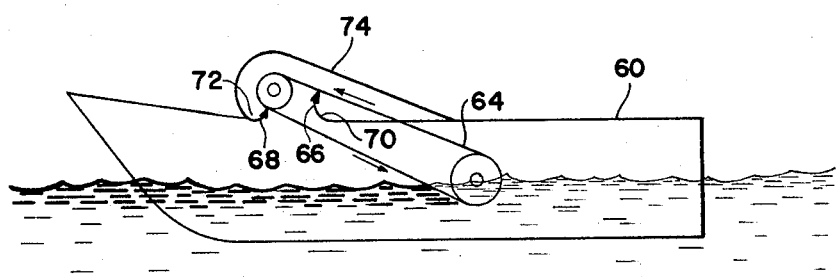

FIGS. 6 and 7 show the collection apparatus adapted to a catamaran type of boat 60 which is particularly well-suited in that the twin hulls 62 can function as the trough-forming members instead of providing separate members for this purpose. In this modification, a single belt collection member 64 is employed supported on the hulls to extend downward therebetween and may be fabricated and provided with a suitable surface in a manner previously described of the belts in FIG. 3. As in all of the collection devices, the lower end of the collection member is partially submerged into the body of water. A pair of wiper blades 66 and 68 are associated in this modification with the single belt. Wiper 66 is located to engage the inside surface of belt 64, and wiper 68 is located to engage the outer surface of belt 64. Suitable troughs 70 and 72 are associated with the respective wipers to transport the recovered oil to reservoirs in hulls 62. A cover plate 74 may be provided to avoid the spraying of oil by the moving belt.

The apparatus constructed according to the teaching of this invention is able to recover waste oils of various viscosities efficiently and expeditiously. This result is achieved because the apparatus operates on the principle of adsorption as distinguished from absorption as relied upon in the prior art. Not only does absorption of the waste oil require more time, especially when recovering heavy oils, but, in addition, the squeezing action required to remove the oil absorbed into the nubby collection surface is more destructive. This requires more frequent replacement which is costly and time-consuming, especially in a water-borne environment. By using a relatively smooth collection surface having a high molecular weight solid hydrocarbon material, the oil adhering to the collection surface need only be wiped off minimizing wear and the need for replacement.

Obviously many modifications and variations of the present invention are possible in the light of the above teachings. It is therefore to be understood that within the scope of the appended claims the invention may be practiced otherwise than as specifically described.

What is claimed is:

1. Apparatus for removing a liquid hydrocarbon from a body of water comprising:
    a catamaran type boat having spaced-apart hulls;
    an endless belt having a relatively smooth surface made of a material including a high molecular weight solid hydrocarbon, to which said liquid adheres;
    said belt being positioned entirely between the ends of said hulls with the hulls forming a trough leading to the belt;
    said endless belt angularly disposed with respect to the water surface with an upper end projecting forward of the lower end with respect to the direction of boat travel;
    means for continuously moving the lower leg of said endless belt downward into said body of water to enable the liquid to be wetted on said surface;
    means for wiping the surface of the belt to remove the liquid adhered thereto.

2. The apparatus of claim 1 wherein wiping means are provided for engaging each leg on opposite sides of said belt.

* * * * *